(12) United States Patent
Huntimer

(10) Patent No.: US 8,550,514 B2
(45) Date of Patent: Oct. 8, 2013

(54) DUAL PURPOSE SNOWMOBILE SNOW FLAP

(75) Inventor: Todd M. Huntimer, Arlington, SD (US)

(73) Assignee: Slydog, Inc., Arlington, SD (US)

( * ) Notice: Subject to any disclaimer, the term of this patent is extended or adjusted under 35 U.S.C. 154(b) by 4 days.

(21) Appl. No.: 13/226,312

(22) Filed: Sep. 6, 2011

(65) Prior Publication Data

US 2013/0057002 A1    Mar. 7, 2013

(51) Int. Cl.
*E01H 5/02*    (2006.01)

(52) U.S. Cl.
USPC .............................. 294/51; 280/847

(58) Field of Classification Search
USPC .............. 294/49, 51, 54.5, 57; 180/182–185, 180/190–193; 280/847, 851; 224/408
See application file for complete search history.

(56) References Cited

U.S. PATENT DOCUMENTS

| | | | | |
|---|---|---|---|---|
| 3,884,498 | A | * | 5/1975 | Cote, Jr. ................... 280/762 |
| 4,418,782 | A | * | 12/1983 | Nakazima ................ 180/190 |
| 5,678,873 | A | * | 10/1997 | Robinson ................... 294/51 |
| 6,003,915 | A | * | 12/1999 | Bierman .................... 294/51 |
| 7,328,765 | B2 | * | 2/2008 | Ebert et al. ............... 180/190 |
| 2002/0189876 | A1 | * | 12/2002 | Girouard et al. ......... 180/182 |
| 2010/0147916 | A1 | * | 6/2010 | Roberts et al. ........... 224/408 |

* cited by examiner

*Primary Examiner* — Dean Kramer
(74) *Attorney, Agent, or Firm* — Lowe Graham Jones PLLC

(57) ABSTRACT

A snow flap for a snowmobile functions as a removable snow shovel blade. The handle may be used as a pivot attachment for the blade to the snowmobile and may be alternatively attached to the blade in a different orientation for use as a shovel. Quick release attachment of the blade to the rear of the snowmobile permits ease of use.

10 Claims, 4 Drawing Sheets

DUAL PURPOSE SNOWMOBILE SNOW FLAP

FIELD OF THE INVENTION

This invention relates generally to a snow flap for a snowmobile and, more specifically, to a snow flap that can be removed and used as an avalanche shovel.

BACKGROUND OF THE INVENTION

Modern snowmobiles typically have a snow flap at the rear of the chassis, which extends downward to prevent snow from being thrown up onto the rider by the action of the track. The snow flap is typically mounted at the rear of the tunnel of a snowmobile.

It is best practice, and in some snowmobiling locations it is essentially required, for a snowmobile operator to carry an shovel so that the rider can extract himself, his machine, or his companions from the snow, including when a snowmobile or operator is stuck.

Shovels are often designed to be carried on a user's back, for example, strapped to a backpack. This can result in a user forgetting a shovel, or losing or misplacing a shovel if, for example, it falls loose from the pack. Shovels may alternatively be strapped to the top of the snowmobile tunnel or placed in under-seat storage.

However, a shovel designed to be carried on a backpack or other area of a user's personal equipment or under the snowmobile hood or under-seat storage is often generally smaller than an optimally sized snow shovel. Avalanche shovels for example, like much equipment designed to be carried on the person, are often designed to minimize weight and size, keeping carried avalanche shovels at the lowest end of a useful size range. A larger shovel, if available in an emergency or basic "dig-out" situations, would often be more useful than shovels of the size most users are willing and able to carry.

SUMMARY OF THE INVENTION

The present invention relates to a snow flap that also functions as an avalanche shovel.

In an embodiment of the invention, the flap is removable from a mount which is attached to tunnel. A handle can be inserted into the back of the flap, converting it into an avalanche shovel.

In a further embodiment, the handle is also used to attach the flap to the mount on the tunnel.

The handle can be separately carried by the user or carried on the snowmobile, or can be permanently mounted to the flap/shovel blade.

The handle can also serve other useful purposes. For example, it can be made telescopically extendable for ease of use or can contain an avalanche probe.

In a preferred embodiment, the flap pivots on the mount. Where the flap contacts the mount, the two are designed to prevent downward and rearward motion beyond a certain point so that the flap does not impinge on the track. The flap pivots up from that point to reduce the risk that stronger forces of snow or from other sources bend or break the flap.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
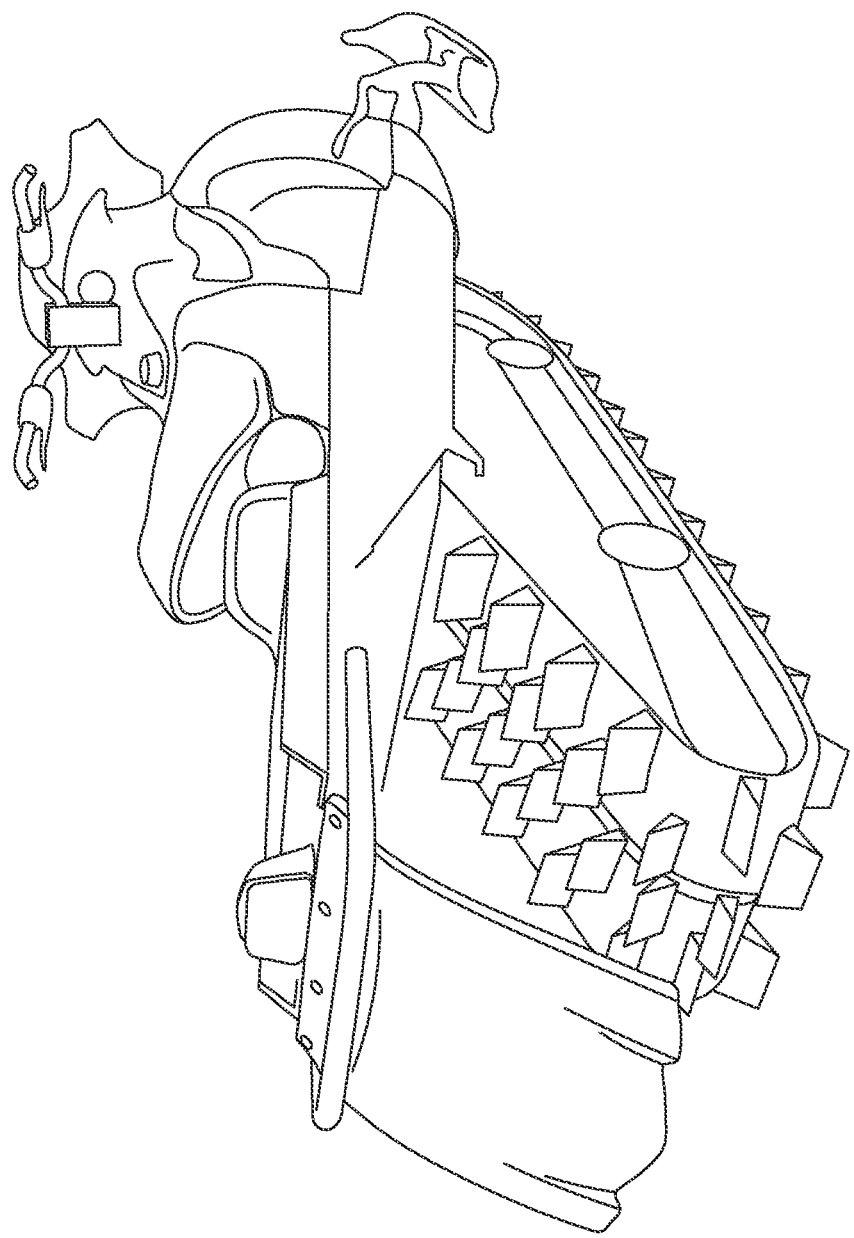
FIG. 1 is an overview of a modern snowmobile particularly showing the position of the tunnel and flap.

FIG. 1 shows a perspective view of a snowmobile from the rear, showing the position of the flap on a standard snowmobile.

Figure 2:
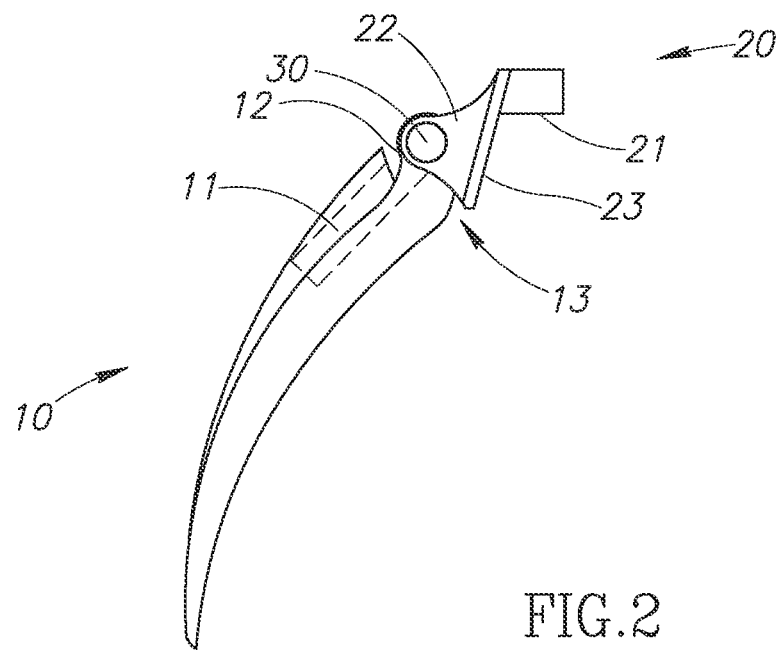
FIG. 2 is a side view of a flap and mount of the present invention.

FIG. 2 shows a side view of flap/shovel blade 10. Flap/shovel blade 10 receives a handle in handle mount 11. At the top 12 of flap/shovel blade 10, it mounts to upper mount 20. The front side 13 of the top of the flap/shovel blade may abut the lower portion of a face mount to prevent rearward travel of the flap beyond a predetermined point. Upper mount 20 is fastened to the snowmobile tunnel, e.g., at a top mount 21 or face mount 23. The upper mount receives the flap at flap mount 22. Face mount 23 may abut the front side 13 of the flap/shovel blade 10 to prevent it from rotating downward beyond a predetermined point. Quick release fastener 30 attaches the flap/shovel blade 10 to the upper mount 20.

Handle 40 can be fastened to upper mount 20, can comprise quick release 30, or can be carried separately from the shovel, either on the user's personal equipment or mounted elsewhere on the snowmobile.

In an embodiment, flap/shovel blade 10 and upper mount 20 can join as a hinge with the quick-release mechanism functioning as a hinge pin. Handle 40 can be the hinge pin in an embodiment.

Flap/shovel blade 10 can be made of any sufficiently strong material, including metals, plastics, or composites. It can be made from a combination of materials, such as a blade made predominantly from plastic materials with an aluminum blade edge which can cut more readily into snow and ice.

Advantageously, because flap/shovel blade 10 is mounted on the snowmobile on normal operation, there can be less concern about making the device very small or extremely lightweight. Rather, a device of appropriate size to function effectively as a snow flap is generally larger than any standard avalanche shovel designed to be carried on the person, and is much closer to an optimally large size for shoveling snow.

Flap/shovel blade 10 can be straight, or can have a curve along either or both of its length and width for strength and for ease of shoveling. It can have sidewalls to help hold snow on the shovel and/or to prevent snow from being thrown to the sides of the snowmobile when mounted as a flap.

Figure 3:
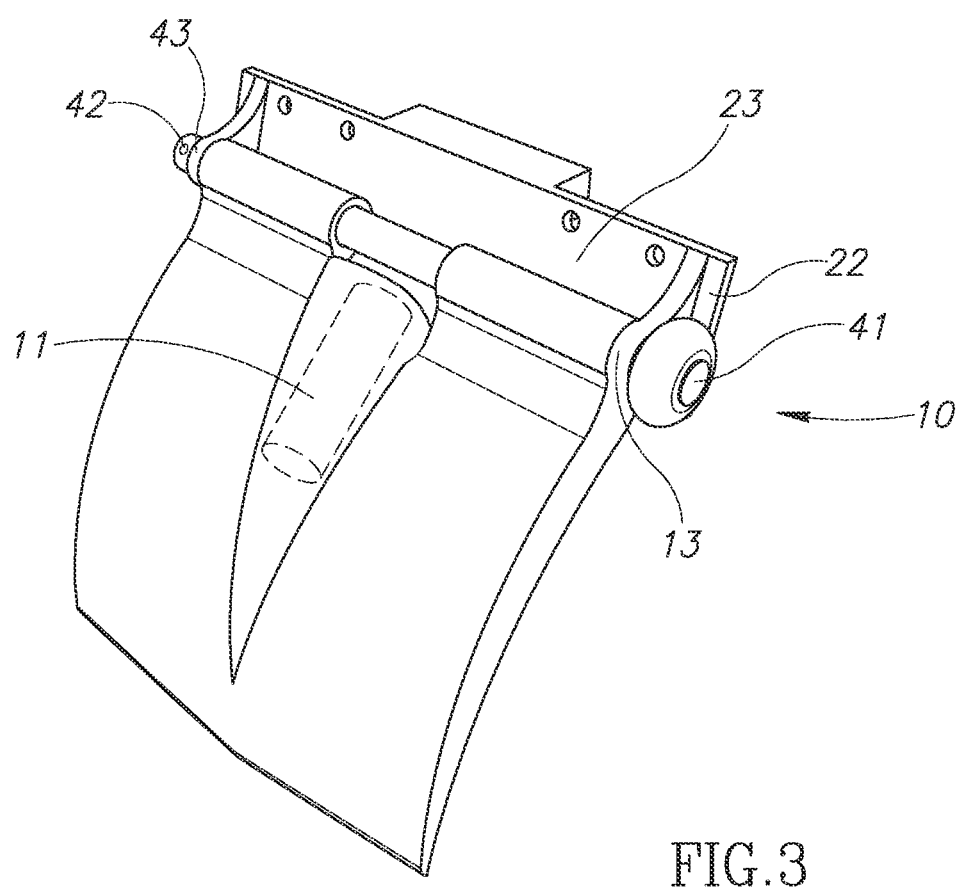
FIG. 3 is a perspective view of a flap, mount, and handle of the present invention.

FIG. 3 shows an embodiment of the dual use flap/shovel in which the shovel handle 40 is used to secure the flap to the upper mount. Handle 40 includes grip 41 and shaft 42. Handle 40 is held in place during use by ball detents, cotter pins, springs, or any other releasable mechanism such as the ball detents 43 shown here. Naturally, handle mount 11 can be compatible with the method of retaining handle 40 to the flap and upper mount so that the same mechanism can be used to hold it in both positions. Alternately, different mechanisms can be used, if, for example, it is expected that greater force will be exerted on the handle when used as a shovel than when used as a quick release.

Additionally, handle 40 can telescope to greater lengths, even beyond lengths useful as a shovel handle. For example, it could include multiple extendible sections so that, when fully extended, it is useful as an avalanche probe.

Figure 4A:
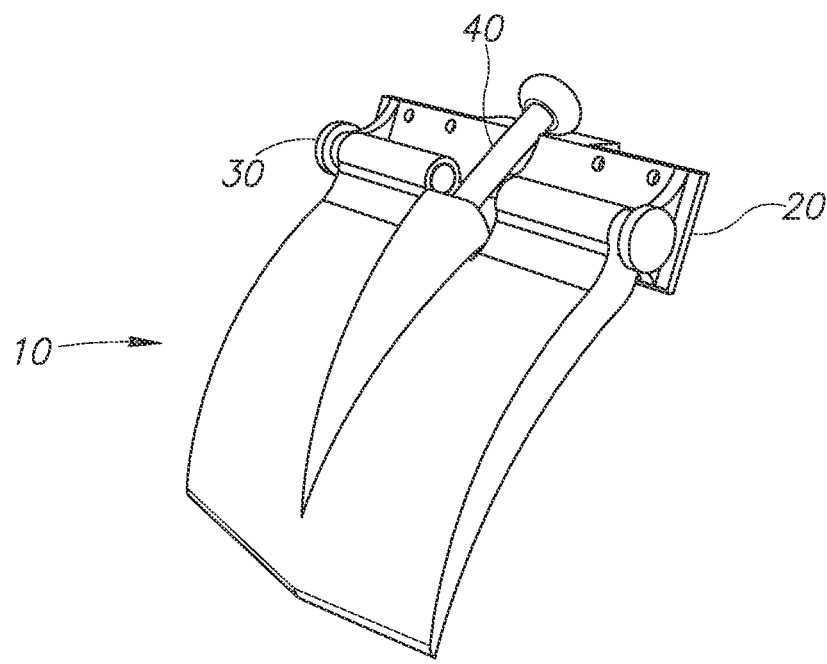
FIGS. 4A and 4B are a perspective view of an alternate embodiment of the present invention, wherein the handle is permanently affixed to the flap/blade.

FIG. 4A shows an embodiment of the present invention in which handle 40 is permanently mounted to the back of flap/shovel blade 10. In an embodiment, the handle and flap/shove blade have similar radius curves (including zero curve) so that handle 40 can be pushed down towards the bottom of the flap/shovel blade when it is mounted as a flap. Upon removal from the snowmobile, the handle can be drawn upwards in handle mount 11 to a position where the device is usable as a shovel.

Figure 4B:
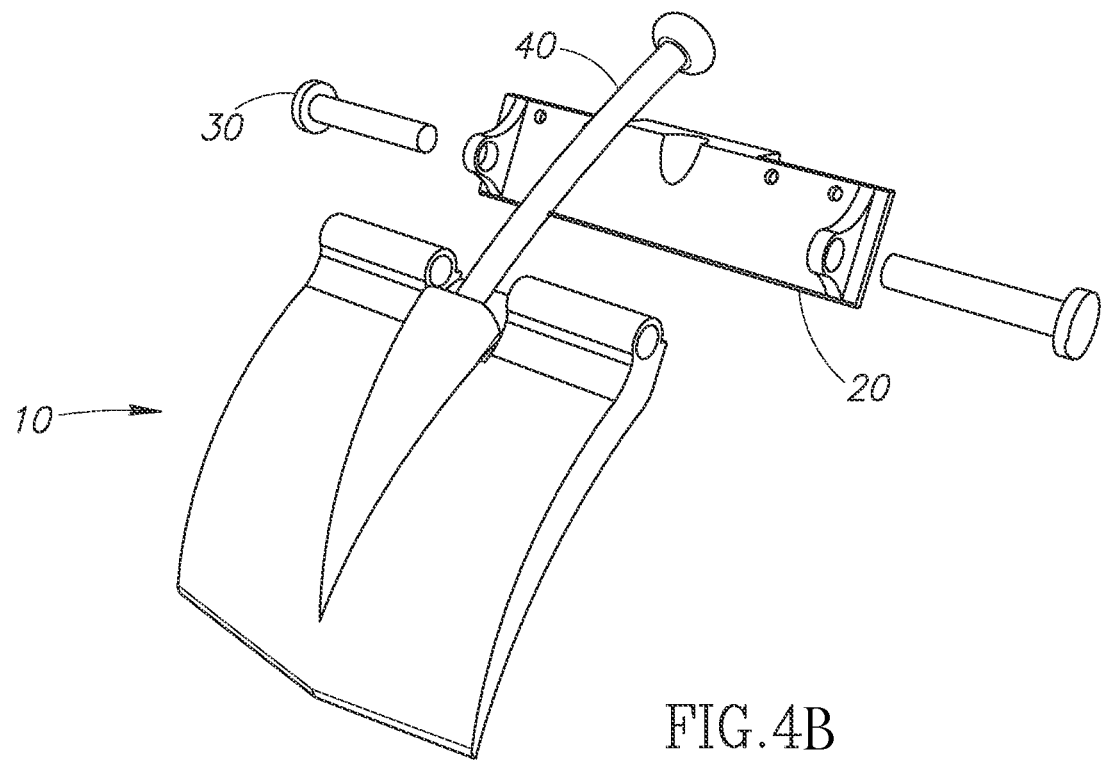

FIG. 4B shows the embodiment of FIG. 4A after flap/shovel blade 10 has been removed from upper mount 20 and handle 40 extended for use as a shovel.

FIG. 4A shows an alternate method of attaching a shovel blade, where the quick-release mechanism 30 retracts outwards from the sides of upper mount 20 to allow flap/shovel blade 10 to be inserted, after which quick release 30 is pushed back into place. Quick release 30 can be held in place to retain flap/shovel blade 10 by, for example, springs, pins, detents, or other mechanisms.

Figure 5:
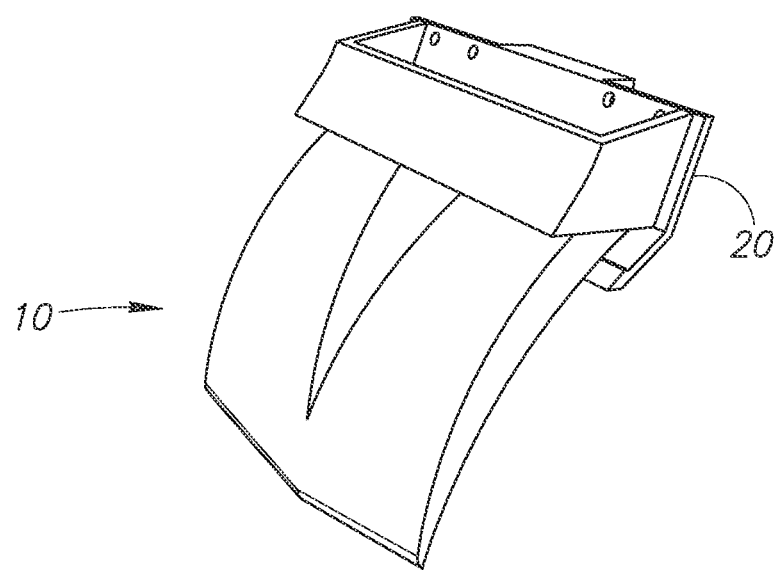
FIG. 5 is an alternate embodiment of the present invention, wherein the upper mount receives the blade in a slot.

FIG. 5 shows an alternate configuration for upper mount 20, wherein flap/shovel blade 10 is inserted into a slot in upper mount 20. In an embodiment, flap/shovel blade 10 is allowed a range of pivoting motion by biasing structures within the slot, such as cushioning rubber or the like. Alternately, flap/shovel blade 10 can pivot on a quick release mechanism. Handle 40 can be attached to flap/shovel blade 10 as in the embodiment of FIG. 4A, or can be carried separately, or can be the quick release mechanism.

Flap/shovel blade 10 can be held in place within the slot of this embodiment by friction fit, by pins, by detents, by a separate quick release which can be handle 40, or by other mechanisms.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined by reference to the claims that follow.

The embodiments of the invention in which an exclusive property or privilege is claimed are defined as follows:

1. A snowmobile flap securable to a rearward end of a snowmobile tunnel, the flap comprising:
    a shovel blade having a lower edge and an upper mount, the upper mount having a mount body securable to the snowmobile tunnel and a handle mount arranged to receive a shovel handle; and
    a quick-release fastener securable between the tunnel and said mount body.

2. The flap of claim 1 wherein the shovel handle is usable as the quick-release fastener.

3. The flap of claim 1 wherein the blade includes a curved contour extending from the mount body to the lower edge, the contour providing rigidity to the blade.

4. The flap of claim 1 wherein the shovel handle further comprises at least one releasable retaining device.

5. The flap of claim 4 wherein the handle mount further comprises at least one retaining device receiving portion.

6. The flap of claim 1 wherein the shovel handle is extendible to at least two working lengths.

7. The flap of claim 1 wherein the mount body prevents downward movement of the flap.

8. The flap of claim 1 wherein the mount body permits upward movement of the flap.

9. A snowmobile snow flap usable as an avalanche shovel comprising:
    a shovel blade; and
    handle attachment means fixed to the blade; and
    separable hinge means attachable to the shovel blade and a snowmobile tunnel; and
    removable connecting means insertable in the hinge means for use as a hinge pin and insertable in the handle attachment means for use as a shovel handle.

10. A snowmobile snow flap usable as an avalanche shovel comprising:
    a shovel blade; and
    a handle mount attached to the blade; and
    a hinge comprising a first hinge portion, a second hinge portion, and a removable hinge pin, the hinge pin having a handle end and an insertion end;
    wherein the first hinge portion is attached to the shovel blade, the second hinge portion is configured for attachment to a snowmobile tunnel, and the insertion end of the hinge pin is receivable in the handle mount such that upon receipt of the hinge pin in the handle mount, the hinge pin and the blade form a shovel.

* * * * *